(12) United States Patent
Feuillette et al.

(10) Patent No.: US 11,722,298 B2
(45) Date of Patent: Aug. 8, 2023

(54) PUBLIC-PRIVATE ENCRYPTION KEY GENERATION USING PCELL PARAMETER VALUES AND ON-CHIP PHYSICALLY UNCLONABLE FUNCTION VALUES

(71) Applicant: GLOBALFOUNDRIES U.S. INC., Malta, NY (US)

(72) Inventors: Romain H. A. Feuillette, San Jose, CA (US); David C. Pritchard, Glenville, NY (US); Bernhard J. Wunder, Westford, VT (US); Elizabeth Strehlow, Malta, NY (US)

(73) Assignee: GlobalFoundries U.S. Inc., Santa Clara, CA (US)

(*) Notice: Subject to any disclaimer, the term of this patent is extended or adjusted under 35 U.S.C. 154(b) by 112 days.

(21) Appl. No.: 17/020,895

(22) Filed: Sep. 15, 2020

(65) Prior Publication Data
US 2022/0085994 A1 Mar. 17, 2022

(51) Int. Cl.
*H04L 9/08* (2006.01)
*H04L 9/32* (2006.01)

(52) U.S. Cl.
CPC .......... *H04L 9/0869* (2013.01); *H04L 9/0825* (2013.01); *H04L 9/0894* (2013.01);
(Continued)

(58) Field of Classification Search
None
See application file for complete search history.

(56) References Cited

U.S. PATENT DOCUMENTS 8,374,341 B2   2/2013  Chevallier-Mames et al.
8,415,969 B1 * 4/2013  Ficke ...................... G06F 7/588
                                                         326/8
(Continued)

FOREIGN PATENT DOCUMENTS

CN   109842488 A  *  6/2019
CN   110324151 A  *  10/2019  ........... H04L 9/3221
(Continued)

OTHER PUBLICATIONS

Barman et al., "Fingerprint-Based Crypto-Biometric System for Network Security," EURASIP Journal on Information Security, 2015, pp. 1-17.
(Continued)

*Primary Examiner* — Saleh Najjar
*Assistant Examiner* — Shadi H Kobrosli
(74) *Attorney, Agent, or Firm* — David Cain; Hoffman Warnick LLC

(57) ABSTRACT

Methods and systems generate seeds for public-private key pairs by determining a timestamp value associated with a process design kit (PDK) when a user of the PDK triggers a tool of the PDK while designing an integrated circuit device to have a physical unclonable function device (PUF). The methods and systems generate a first value by mapping the timestamp value to data of the user, generate a second value by mapping the timestamp value to configuration data of the PDK, and generate a third value by mapping the timestamp value to layout data of the PDK. A random number is then generated by applying a function to the first value, the second value, and the third value. A public-private encryption key pair is generated using the random number as a first seed number and using a second number generated by the number generation device as a second seed number.

20 Claims, 4 Drawing Sheets

(52) U.S. Cl.
CPC .......... *H04L 9/3278* (2013.01); *H04L 9/3297* (2013.01); *H04L 2209/12* (2013.01)

(56) References Cited

U.S. PATENT DOCUMENTS

| | | | |
|---|---|---|---|
| 8,874,602 B2 | 10/2014 | Harada et al. | |
| 9,953,166 B2 | 4/2018 | Newell | |
| 10,778,451 B2* | 9/2020 | Ramlall | H04L 9/0861 |
| 11,044,107 B2* | 6/2021 | Adams | H04L 9/0861 |
| 11,251,959 B2* | 2/2022 | Wentz | G06F 21/73 |
| 2008/0279373 A1* | 11/2008 | Erhart | H04L 9/3249 |
| | | | 714/E11.017 |
| 2013/0051552 A1* | 2/2013 | Handschuh | H04L 9/0897 |
| | | | 380/44 |
| 2015/0006601 A1* | 1/2015 | Aissi | H04L 63/0428 |
| | | | 708/250 |
| 2017/0005811 A1* | 1/2017 | Tremlet | H04L 9/3278 |
| 2018/0034629 A1* | 2/2018 | Cheng | H04L 9/0869 |
| 2019/0165954 A1 | 5/2019 | Lu | |
| 2020/0351098 A1* | 11/2020 | Wentz | H04L 9/3247 |
| 2020/0356085 A1* | 11/2020 | Wentz | H04L 9/0866 |
| 2021/0091952 A1* | 3/2021 | Wentz | H01L 23/573 |
| 2021/0312057 A1* | 10/2021 | Kloth | G06F 21/572 |
| 2022/0271955 A1* | 8/2022 | Dewan | H04L 9/14 |

FOREIGN PATENT DOCUMENTS

| | | | | |
|---|---|---|---|---|
| DE | 102004037814 A1 | * | 3/2006 | ............. G06F 7/582 |
| EP | 2230793 A2 | * | 9/2010 | ............. G06F 21/10 |
| EP | 3474514 A1 | * | 4/2019 | ........... G06F 21/335 |
| JP | 2014509812 A | * | 4/2014 | |
| WO | WO-2019055307 A1 | * | 3/2019 | ............. G06F 21/87 |

OTHER PUBLICATIONS

Nandini et al., "Efficient Cryptographic Key Generation from Fingerprint Using Symmetric Hash Functions," International Journal of Research and Reviews in Computer Science; Kohat, vol. 2, Issue 4, 2011, Abstract.

Suh et al., "Physical Unclonable Functions for Device Authentication and Secret Key Generation," IEEE, 2007, pp. 1-6.

* cited by examiner

PUBLIC-PRIVATE ENCRYPTION KEY GENERATION USING PCELL PARAMETER VALUES AND ON-CHIP PHYSICALLY UNCLONABLE FUNCTION VALUES

BACKGROUND

Field of the Invention

The present disclosure relates to encryption technologies and more specifically to public-private encryption key generation using on-chip physically unclonable function devices (PUF).

Description of Related Art

Modern integrated circuit devices are often generated using information provided in a process design kit (PDK). In one example, Pcells (parameterized cells) are used to automatically create layout instances according to the information within the PDK using electronic design automation (EDA) software. A Pcell layout instance is a part (physical component) of the integrated circuit device whose structure is dependent on one or more parameters of the PDK, and each layout instance of the Pcell is automatically generated based on the values of these parameters.

More specifically, a Pcell represents an IC component and includes an executable parameter customization program (also referred to as a parameter customization script). The IC component represented by a specific Pcell can be a single device (e.g., a transistor, capacitor, resistor, etc.) or multiple interconnected devices (e.g., a logic gate). The customization script allows one or more geometric parameters of one or more devices of an IC component represented by a Pcell to be user-customized through a graphic user interface (GUI). Thus, if multiple instances of a specific Pcell are inserted into an IC design (or representation), at least some of those instances may be user-customized so as to have different geometric parameter combinations (also referred to herein as different Pcell configurations). For example, if multiple instances of a transistor Pcell are inserted into an IC design, at least some of the different instances may be user-customized so as to have different channel length and width combinations (i.e., different Pcell configurations).

The PDK itself is a set of files used to model the fabrication process. PDKs are usually in the form of databases and can include various information such as a device library that has symbols, device parameters, Pcells, etc.; verification decks that provide design rule checking, layout versus schematic checking, antenna and electrical rule checking, physical extraction, etc.; technology data layers, such as layer names, layer/purpose pairs, colors, fills and display attributes, process constraints, electrical rules, etc.; rule files including LEF (library exchange format) files, tool dependent rule format files, etc.; simulation models (SPICE (simulation program with integrated circuit emphasis) for transistors, capacitors, resistors, inductors, etc.; a design rule manual that provides a user friendly representation of the process requirements; as well as other fabrication process information; etc.

Also, number generators can be included as distinct physical devices on chips to produce seed values used in encryption processing. A "seed value" refers to a data string, which is run through an algorithm to produce an encryption key. One type of number generator is a physically unclonable function device (PUF) that generates unique numbers (signatures) based on device manufacturing variations specific to each chip that are difficult to control or reproduce. Given a fixed challenge (helper data) as input, a PUF outputs a response that is unique to the manufacturing instance of the PUF circuit (unique to that PUF). These responses of different PUFs are similar, but not necessarily bit exact, when regenerated on a given device using a given challenge. A key generator should reliably produce an earlier provisioned key, given the corresponding input (helper data). Traditionally, a PUF-based key generator combines the helper data with its unique, unclonable hardware function, so that only the presence of both the hardware circuit and the helper data leads to the correct key, while the helper data alone does not reveal any usable information about the key.

SUMMARY

Generally, a user operates a computerized device to use a process design kit (PDK) and electronic design automation (EDA) software to design an integrated circuit device that has a physical unclonable function device (PUF). Various methods herein generate public-private key pairs by first generating a timestamp value associated with the PDK when a user of the PDK triggers an aspect of the PDK (e.g., a cryptographic tool of the PDK). For example, the timestamp can be generated by calculating the accumulated time from the installation of the PDK on the computerized device to when the user triggers the cryptographic tool of the PDK.

In processing herein, configuration data of the PDK is generated by applying a function to parameter values of the configuration of a parameterized cell (Pcell) of the PDK. Additionally, layout data of the PDK is generated by applying a second function to layout properties of the configuration of the Pcell of the PDK.

Additionally, a first value (or key) is generated by mapping the timestamp value to first data of the user and applying a first function to the first data, a second value is generated by mapping the timestamp value to configuration data of the PDK and applying a second function to the configuration data, and a third value is generated by mapping the timestamp value to layout data of the PDK and applying a third function to the configuration data. The functions may be different from one another and can be, for example, addition, subtraction, multiplication, and/or division, etc.

Additionally, with processing herein a random number is generated by applying a function to the first value, the second value, and the third value. Such process generates a public-private encryption key pair using the random number as a first seed number and using a second number generated by the number generation device as a second seed number.

BRIEF DESCRIPTION OF THE DRAWINGS

The embodiments herein will be better understood from the following detailed description with reference to the drawings, which are not necessarily drawn to scale and in which.

DETAILED DESCRIPTION

The physically unclonable function device (PUF) discussed above is useful for generating unique seed values used in encryption processing performed by, for example, secure cryptoprocessors. For example, a PUF on a manufactured chip (when supplied a secret input) can reliably output a secret seed value that can be used to generate encryption keys. The use of PUFs increases security because one must know the secret input and know how to generate the encryption key from the secret seed value output by the PUF. However, PUFs are not completely undefeatable. Processes that can discover the seed values produced by the PUFs can decrease the security of such items. Also, PUFs may not have enough entropy for the large numbers of chips that will use such devices and PUFs may be jammed using electromagnetic fields, etc., disturbing their ability to be a controllable source of randomness.

In view of such PUF limitations, the devices and methods herein produce a seed value from a process design kit (PDK) data hash based on a timestamp that is generated at design time. Because the PDK data is unique to each environment and the timestamp is difficult to determine, the seeds for the encryption keys are not easily reproduceable, making the encryption keys difficult to discover.

Thus, systems and methods herein base the seed values not on the PUF alone, but instead create seed values by mapping the timestamp to configuration data of the PDK. Further, the PDK-based data is then combined with the output of the PUF. With this, individual chips are identified and coded with a high-quality PUF implementation; however, a PDK hash and timestamp are also used in order to generate the cryptographic private key. This provides a secure random number generator based at least in part on an element of a hash created from all possible Pcell variations within the PDK. There are an extremely large number (e.g., $7 \times 10^{15}$) of possible Pcell configurations which makes it very difficult to know which configuration was used as seed values. Therefore, the methods and systems herein provide a combination hardware/software solution as an improvement to the hardware-only existing PUF encryption systems that makes reproduction of the seed values very difficult or impossible.

Figure 1:
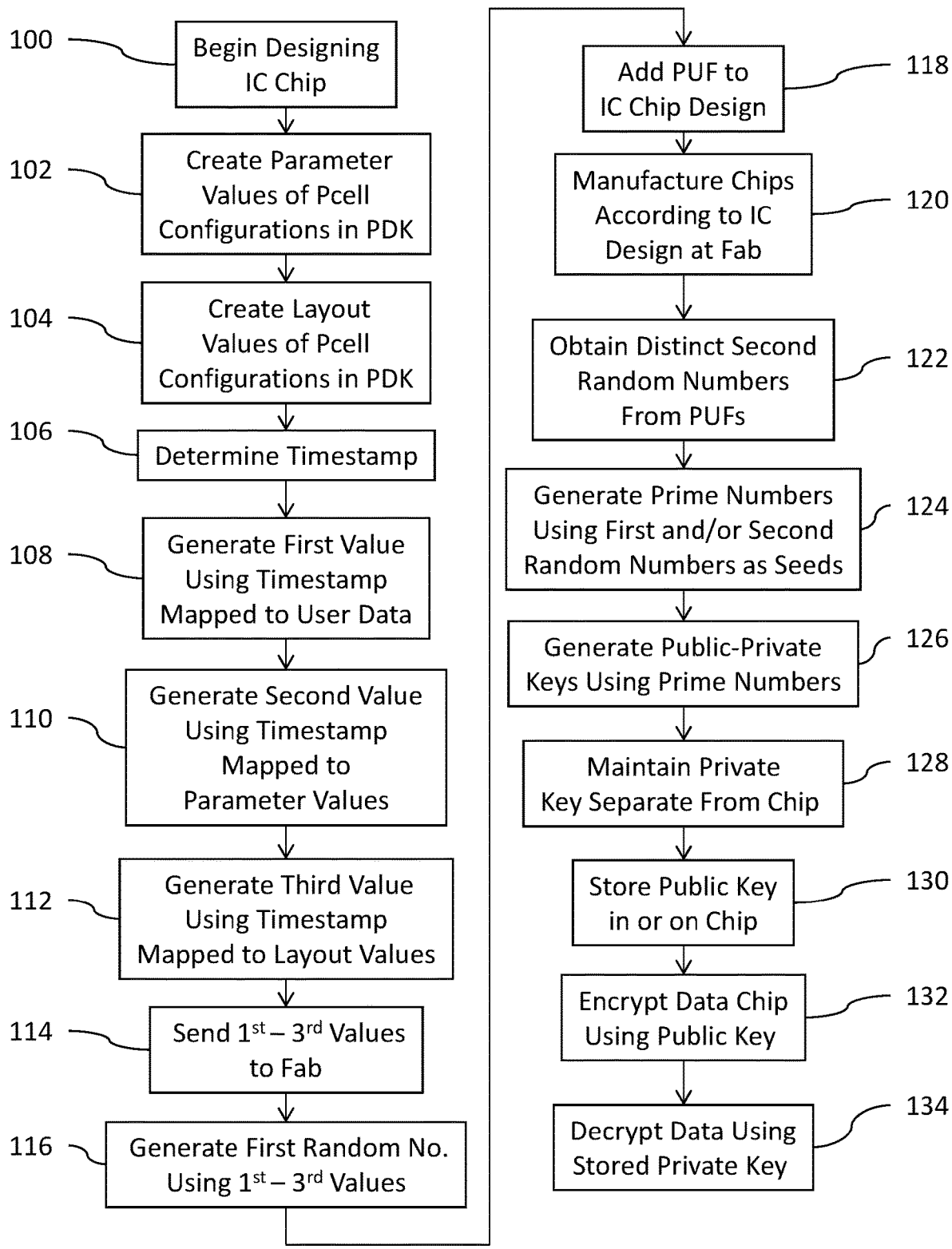
FIG. 1 is a flow diagram illustrating embodiments herein.

In greater detail FIG. 1 is a flowchart illustrating exemplary embodiment herein. Generally, in item 100 in the flowchart in FIG. 1 a user (e.g., chip designer) operates a computerized device to use a parameter application, such as a process design kit (PDK), and electronic design automation (EDA) software to design an integrated circuit (IC) device that has at least one physical unclonable function device (PUF).

In item 102, configuration data of the PDK is generated by applying a configuration function to parameter values of a configuration of at least one parameterized cell (Pcell) of the PDK. Additionally, in item 104, layout data of the PDK is generated by applying a layout function to layout properties of the configuration of the Pcell of the PDK.

These methods generate seed values for producing public-private key pairs by first determining a timestamp value associated with the PDK when a user of the PDK triggers some aspect (e.g., opens a cryptographic tool, etc.) of the PDK, as shown in item 106. In one example, the timestamp can be determined in item 106 by calculating the accumulated time from the installation of the PDK on the computerized device to when the user triggers some aspect of the PDK.

Generation of the seed values for public-private key pairs continues in item 108 where a first value is generated by mapping the timestamp value to data of the user (also referred to herein as user data or first data) and applying a value generation function to that data. The user data that is mapped to using the timestamp value is usually data of the user that changes over time, making such user data difficult to recreate without knowledge of the timestamp. The data of the user mapped to could be any customer-specific data, including but not limited to current data in user's design databases at the timestamp date/time, statistics of user's hardware performance (memory/processor usage, communication/processing speeds, performance parameters, etc.) at the timestamp date/time, data from current error/usage logs at the timestamp date/time, etc. Thus, the timestamp value is "mapped" to any data of the user by obtaining a value from such user data at the time/date corresponding to the timestamp.

In item 110, a second value is generated by mapping the timestamp value to configuration data of the PDK and applying another value generation function to the configuration data. In item 112, a third value is generated by mapping the timestamp value to layout data of the PDK and applying a third value generation function to the layout data. These functions can be different from one another and can be, for example, addition, subtraction, multiplication, and/or division, etc., or more complex functions. The first-third values are then sent to a fabrication facility that manufactures the integrated circuit structures (item 114).

Any entity (e.g., the EDA, the fabrication facility, etc.) can then perform standard number generation to generate a first random number using the first-third values as starting values, as shown in item 116 in FIG. 1. Any function can be used to combine the first-third values where, for example, the first-third values can be multiplied, divided, added, etc., in order to generate the first random number in item 116. Similarly, any entity (e.g., EDA, fabrication facility, etc.) can add physically unclonable function devices (PUFs) to the integrated circuit design/representation, as shown in item 118. Note that items 116 and 118 can occur in any order.

Eventually, IC devices (e.g., semiconductor wafers of chips) are manufactured according to the IC chip design/representation by the fabrication facility (in item 120). Even though the PUFs share an identical design, each PUF will potentially have different physical characteristics from all other identically designed PUFs because each PUF will experience slightly different manufacturing conditions. This occurs because the PUFs are at different wafer locations, are formed on different wafers, are manufactured in different wafer batches, etc. Therefore, each PUF may have differently sized, shaped, and/or positioned conductors, insulators, capacitors, etc., because of manufacturing variances which will change the resistance, voltage, speed, etc., and other performance parameters and cause the same seed input to produce slightly different outputs from different identically designed PUFs.

These slight manufacturing differences between the identically designed PUFs causes each PUF to potentially generate a different random number given the same input. With this, in item 122, the processing herein obtains a second random number from the PUFs (the PUFs have a number generation function) with each different PUF potentially generating a different random number, relative to random numbers generated by other PUFs.

A conventional prime number generator can be used to generate one or more prime numbers using the first and/or second random numbers as seeds, as shown in item 124. Then, any conventional public-private cryptographic key generation methodology (e.g., Diffie-Hellman key exchange protocol, DSS, ElGamal, Elliptic-curve, Paillier cryptosystem, RSA, Cramer-Shoup, YAK, etc.) can be used to generate the public and private keys from the prime numbers generated in item 124, as shown in item 126.

As shown in item 128, the private key is securely maintained separately from the integrated circuit device (chip) on a secure server. In one example, the chip fabrication facility may maintain the private key. The public key may be provided with the chip or maintained on the chip itself, as shown in item 130. Therefore, for example, the public key can be supplied with the chip, printed on the chip, or storage capabilities of the PUF can store the public key.

Thus, in item 132 various data (user data, chip-specific data, etc.) can be encrypted with the public key. With possession of the public key (using the output from the PUF, for example) the user can then encrypt any data that needs to be encrypted in item 132. In item 134 the data encrypted in item 132 is decrypted using the private key. The encrypted data can only be decrypted using the secured private key that is maintained separately from the chip which, as shown above, is secure because the seed values are derived from information that is difficult to access.

Figure 2:
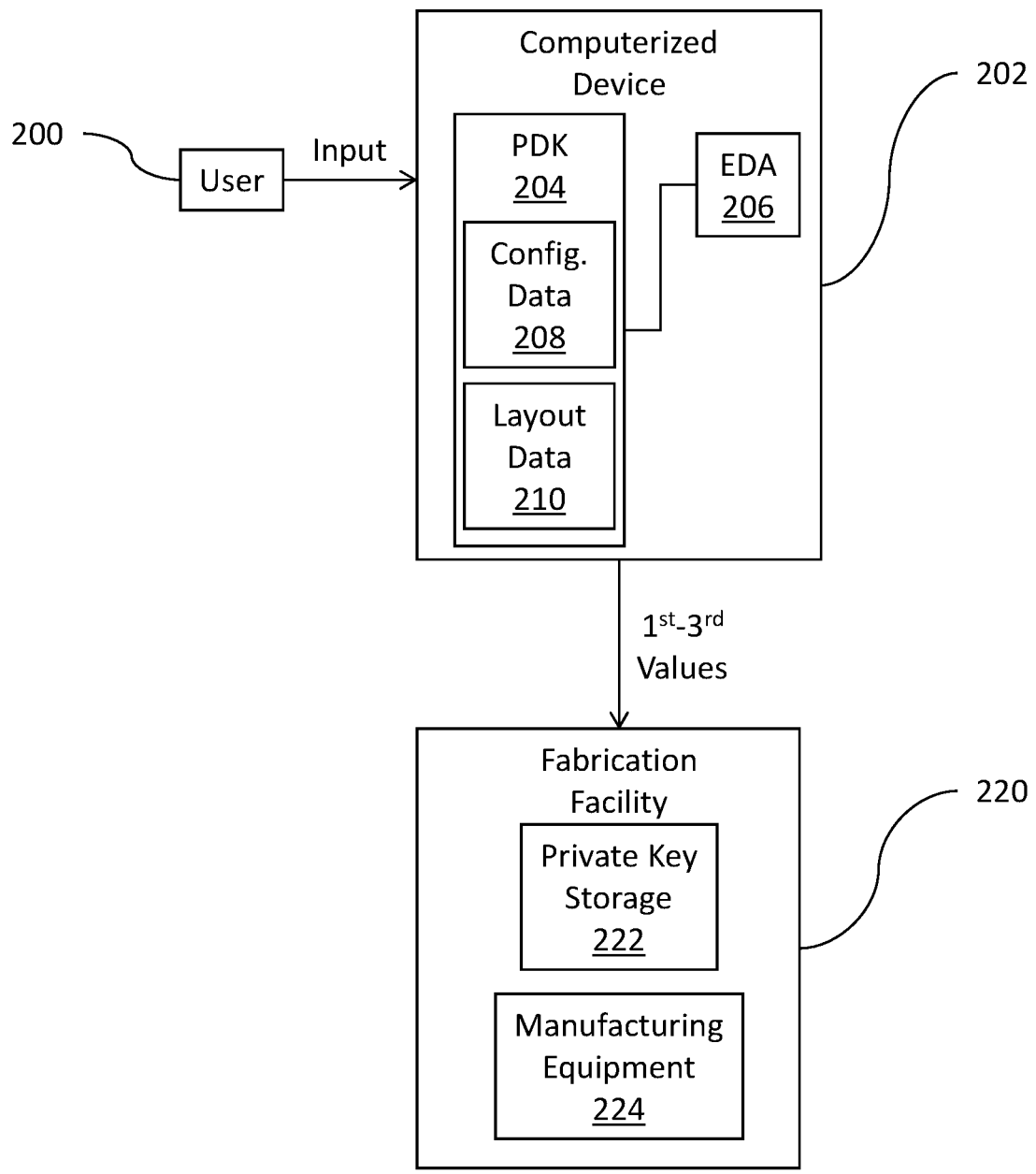
FIG. 2 is a system diagram illustrating embodiments herein.

FIG. 2 shows the above operations in one non-limiting system herein. As shown in FIG. 2, a user 200 operates a computerized device 202 to use a process design kit (PDK) 204 and electronic design automation (EDA) software 206 to design an integrated circuit (IC) device.

Figure 3:
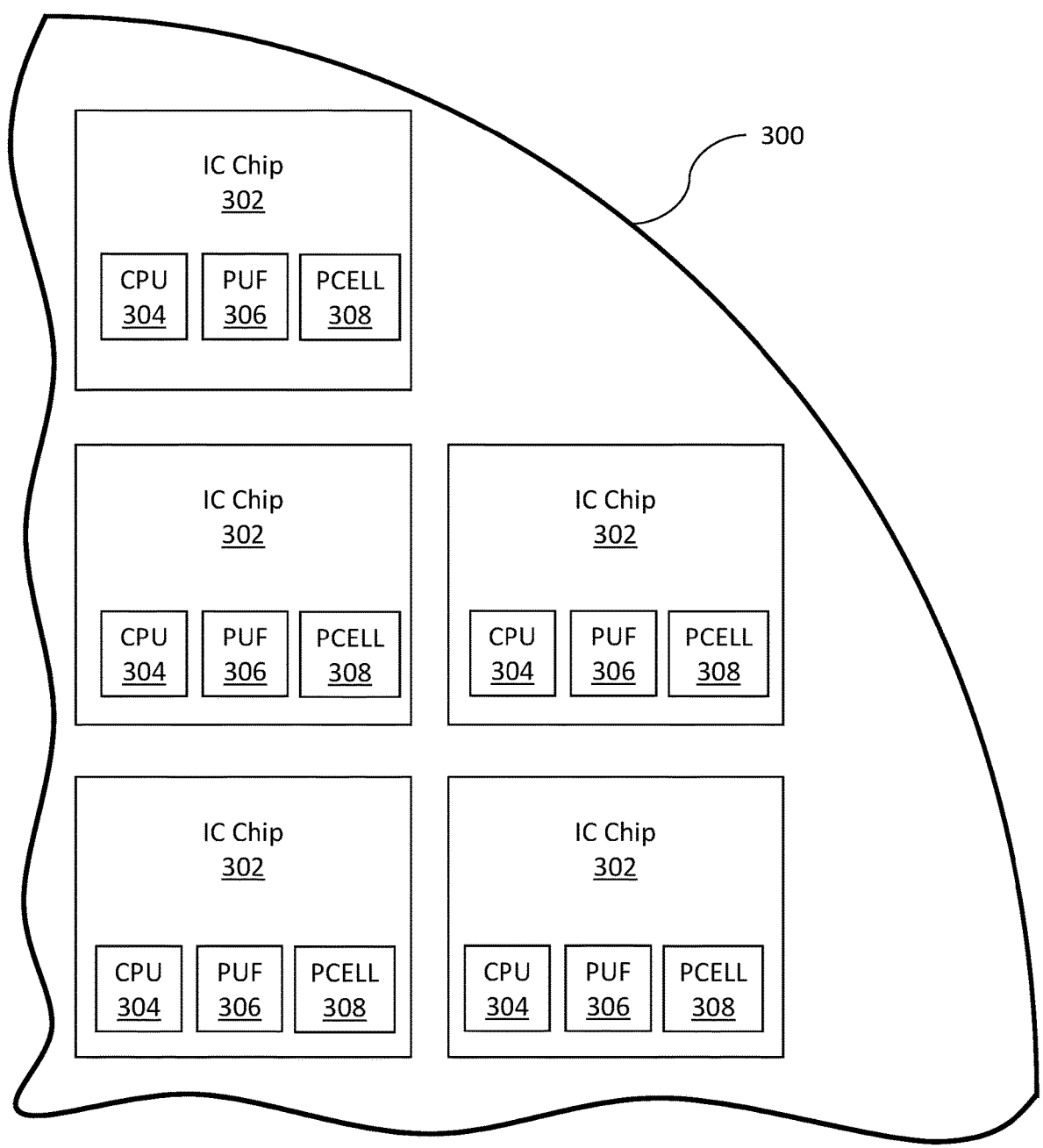
FIG. 3 is a diagram of a portion of a manufactured wafer having integrated circuit chips thereon.

Referring briefly to FIG. 3, a wafer 300 having multiple chips 302 is shown as such a manufactured IC device. FIG. 3 shows that each chip 302 can include various components, some of which can be a processor (central processing unit-CPU) 304, a PUF 306, and a layout generated by a parameterized cell (Pcell) 308, for example. Note that the Pcell itself is not technically something physical that one will find on a chip and what is illustrated by items 308 in FIG. 3 are layout instances generated by a Pcell. The Pcell is an element of the PDK that generates instances of a given device layout. Each instance 308 represents one of the many configurations of layout for a given device.

Referring again to FIG. 2, these systems generate seeds for public-private key pairs by first determining a timestamp value associated with the PDK 204 when the user 200 of the PDK 204 triggers some aspect (e.g., a cryptographic tool) of the PDK 204. As noted above, the timestamp can be determined by calculating the accumulated time from the installation of the PDK 204 on the computerized device 202 to when the user 200 triggers some aspect of the PDK 204. Configuration data 208 of the PDK 204 is generated by the computerized device 202 by applying a configuration function to parameter values of a configuration of at least one parameterized cell (Pcell) of the PDK 204. Additionally, layout data 210 of the PDK 204 is generated by the computerized device 202 by applying a layout function to layout properties of the configuration of the Pcell of the PDK 204.

The system shown in FIG. 2 generates a first value by mapping the timestamp value to data of the user 200 and applying a value generation function to that data. A second value is generated by the computerized device 202 by mapping the timestamp value to the configuration data 208 of the PDK 204 and applying another value generation function to the configuration data 208. Also, a third value is generated by the computerized device 202 by mapping the timestamp value to the layout data 210 of the PDK 204 and applying a third value generation function to the layout data 210. These functions can be, for example, addition, subtraction, multiplication, division, etc. or more complex functions. These first-third values are transmitted from the computerized device 202 to the fabrication facility 220.

An entity (e.g., the computerized device 202, the fabrication facility 220, etc.) can then perform standard random number generation to generate the first random number using some or all of the first-third values as starting values. Similarly, an entity can add physically unclonable function devices (PUFs 306) to the integrated circuit design. Eventually, IC devices (e.g., semiconductor wafers 300 having chips 302 in FIG. 3) are manufactured by manufacturing equipment/components 224 of the fabrication facility 220 according to the IC chip design.

As noted above, the PUFs 306 have a number generation function component, and an electronic storage component. Even though the PUFs 306 share an identical design, each PUF 306 will potentially have different physical characteristics from all other identically designed PUFs 306 because each PUF 306 will experience slightly different manufacturing conditions. This occurs because the PUFs 306 are positioned at different wafer 300 locations, are formed on different wafers 300, are manufactured in different wafer batches, etc. Therefore, each PUF 306 may have differently sized, shaped, and/or positioned conductors, insulators, capacitors, etc., which will change resistance, voltage, speed, etc., and other performance parameters and cause the same seed input to produce slightly different outputs from different identically designed PUFs 306.

These slight manufacturing differences between the identically designed PUFs 306 causes each PUF 306 to potentially generate different random numbers given the same input. With this, the systems herein generate the second random number from the PUFs 306 (with each different PUF 306 potentially generating different random numbers relative to random numbers generated by other PUFs 306, even given the same seed input). A conventional prime number generator (e.g., at the fabrication facility 220) can be used to generate prime numbers using the first and/or second random numbers as seeds. Then, any conventional public-private cryptographic key generation methodology can be used (e.g., by the fabrication facility 220) to generate the public and private keys from the prime numbers previously generated.

The private key is maintained separately from the integrated circuit device (chip 302) on a secure server, such as the private key storage 222 (electronic storage) of the fabrication facility 220. The public key may be maintained with or on the chip 302 itself. Therefore, for example, the public key can be supplied with the chip 302, printed on the chip 302, or electronic storage capabilities of the PUF 306 can store the public key.

Thus, various data (user data, chip-specific data, etc.) can be encrypted with the public key. The public key can be read visibly if printed on the chip 302, can be retrieved from the electronic storage of the PUF 306, obtained from material supplied with the chip 302, etc. With possession of the public key, the user 200 or the chip itself 302 can encrypt any data desired to be encrypted. Also, the encrypted data is decrypted using the private key (e.g., stored in the private key storage 222). The encrypted data can only be decrypted using the private key that is difficult to reproduce and is maintained separately from the chip 302, rendering the encrypted data secure.

Figure 4:
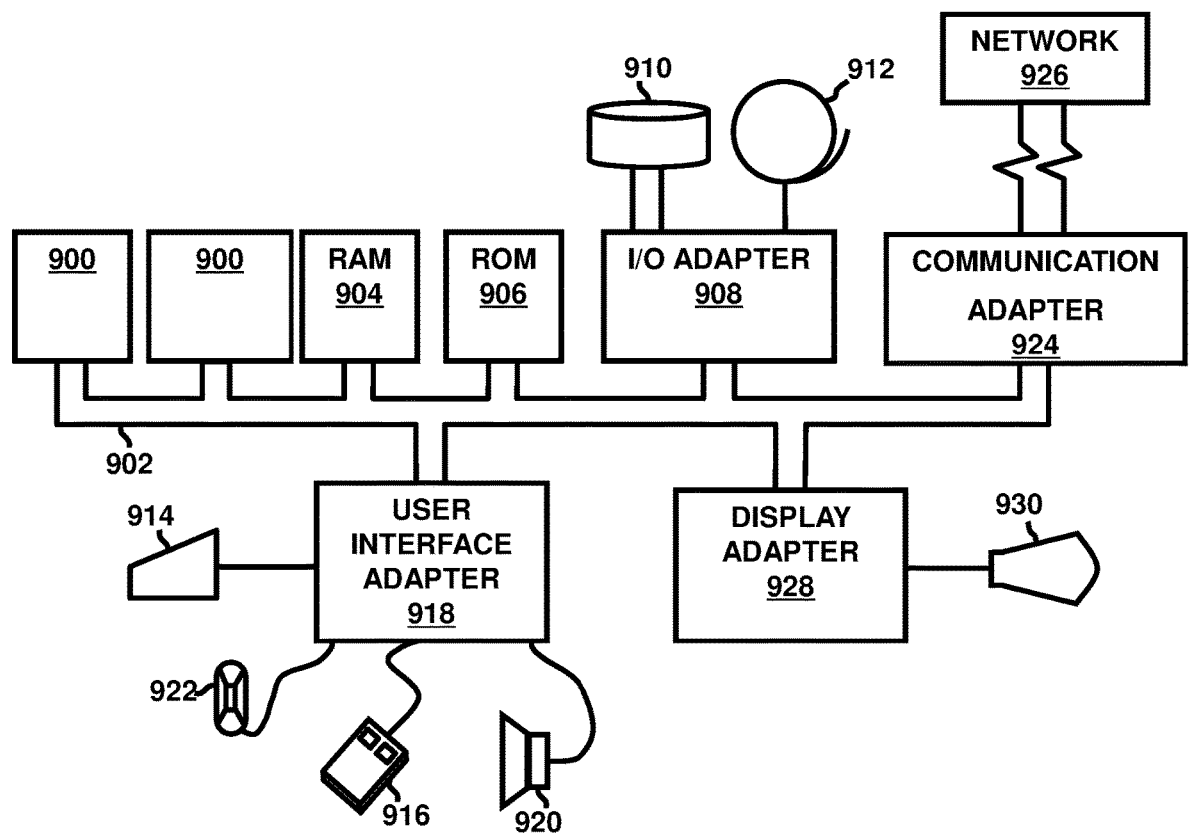
FIG. 4 is a schematic diagram of a hardware system according to embodiments herein.

A representative hardware environment (i.e., a computer system) for implementing the systems, methods and computer program products disclosed above is depicted in FIG. 4. This schematic drawing illustrates a hardware configuration of an information handling/computer system in accordance with the embodiments herein. The system incorporates at least one processor or central processing unit (CPU)

900. The CPUs 900 are interconnected via a system bus 902 to various devices such as a random access memory (RAM) 904, read-only memory (ROM) 906, and an input/output (I/O) adapter 908. The I/O adapter 908 can connect to peripheral devices, such as disk units 910 and tape drives 912, or other program storage devices that are readable by the system. The system can read the inventive instructions on the program storage devices and follow these instructions to execute the methodology of the embodiments herein. The system further includes a user interface adapter 918 that connects a keyboard 914, mouse 916, speaker 920, microphone 922, and/or other user interface devices such as a touch screen device (not shown) to the bus 902 to gather user input. Additionally, a communication adapter 924 connects the bus 902 to a data processing network 926, and a display adapter 928 connects the bus 902 to a display device 930 which may be embodied as an output device such as a monitor, printer, or transmitter, for example.

The flowchart and block diagrams in the figures illustrate the architecture, functionality, and operation of possible implementations of devices and methods according to various embodiments. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the foregoing. As used herein, the singular forms "a," "an," and "the" are intended to include the plural forms as well, unless the context clearly indicates otherwise.

Each respective figure, in addition to illustrating methods of and functionality of the present embodiments at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method described above. In other words, one or more computer hardware devices can be created that are configured to implement the method and processes described herein with reference to the figures and their corresponding descriptions.

Embodiments herein may be used in a variety of electronic applications, including but not limited to advanced sensors, memory/data storage, semiconductors, microprocessors and other applications. A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description but is not intended to be exhaustive or limited to the embodiments in the form disclosed. Many modifications and variations will be apparent to those of ordinary skill in the art without departing from the scope and spirit of the embodiments herein. The embodiments were chosen and described in order to best explain the principles of such, and the practical application, and to enable others of ordinary skill in the art to understand the various embodiments with various modifications as are suited to the particular use contemplated.

While the foregoing has been described in detail in connection with only a limited number of embodiments, it should be readily understood that the embodiments herein are not limited to such disclosure. Rather, the elements herein can be modified to incorporate any number of variations, alterations, substitutions, or equivalent arrangements not heretofore described, but which are commensurate with the spirit and scope herein. Additionally, while various embodiments have been described, it is to be understood that aspects herein may be included by only some of the described embodiments. Accordingly, the claims below are not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later, come to be known, to those of ordinary skill in the art are expressly incorporated herein by reference and intended to be encompassed by this disclosure. It is therefore to be understood that changes may be made in the particular embodiments disclosed which are within the scope of the foregoing as outlined by the appended claims.

What is claimed is:

1. A method comprising:
    generating a timestamp value when designing an integrated circuit (IC) having a number generation device and a parameterized cell;
    generating a first value, a second value, and a third value from the timestamp value;
    generating a random number from the first value, the second value, and the third value; and
    generating a public-private encryption key pair using the random number as a first seed number and using a second number generated by the number generation device in the IC, post-manufacturing, as a second seed number.

2. The method according to claim 1, further comprising:
    manufacturing the IC; and
    generating the second number using the number generation device of a manufactured IC.

3. The method according to claim 2, wherein the public-private encryption key pair comprises a public key and a private key, and wherein the method further comprises storing the public key in the number generation device of the manufactured IC.

4. The method according to claim 2, wherein the public-private encryption key pair comprises a public key and a private key, and wherein the method further comprises storing the private key separate from the manufactured IC.

5. The method according to claim 1, wherein the generating of the random number comprises applying a function to the first value, the second value, and the third value.

6. The method according to claim 1, wherein the designing of the IC comprises generating configuration data of the parameterized cell using a parameter application, and wherein the generating of the random number is based, in part, on the configuration data.

7. A method comprising:
generating a timestamp value associated with a parameter application when a user of the parameter application triggers an aspect of the parameter application, wherein the user operates a computerized device to use the parameter application to produce an integrated circuit (IC) representation having a number generation device;
generating a first value by mapping the timestamp value to first data of the user;
generating a second value by mapping the timestamp value to configuration data of a parameterized cell (Pcell) from the parameter application;
generating a third value by mapping the timestamp value to layout data of the parameter application;
generating a random number by applying a function to the first value, the second value, and the third value; and
generating a public-private encryption key pair using the random number as a first seed number and using a second number generated by the number generation device as a second seed number.

8. The method according to claim 6, further comprising generating layout data of the parameterized cell, and wherein the generating of the random number is based, in part, on the layout data.

9. The method according to claim 7, further comprising:
producing manufactured IC devices according to the IC representation; and
generating the second number using the number generation device of the manufactured IC devices.

10. The method according to claim 9, wherein the public-private encryption key pair comprises a public key and a private key, and wherein the method further comprises storing the public key in the number generation device of the manufactured IC devices.

11. The method according to claim 9, wherein the public-private encryption key pair comprises a public key and a private key, and wherein the method further comprises storing the private key separate from the IC devices.

12. The method according to claim 7, wherein the generating of the first value further comprises applying a first function to the first data,
wherein the generating of the second value further comprises applying a second function to the configuration data, and
wherein the generating of the third value further comprises applying a third function to the configuration data.

13. The method according to claim 7, further comprising generating the configuration data of the parameter application by applying a second function to parameter values of a configuration of a parameterized cell of the parameter application.

14. The method according to claim 7, further comprising generating the layout data of the parameter application by applying a second function to layout properties of a configuration of a parameterized cell of the parameter application.

15. A system comprising:
an interface adapted to interact with a user;
a processor operatively connected to the interface; and
electronic storage operatively connected to the processor,
wherein the electronic storage is adapted to store a parameter application and user data,
wherein the parameter application is adapted to generate a timestamp value when the user of the parameter application triggers the parameter application through interaction with the interface,
wherein the user uses the parameter application to prepare an integrated circuit (IC) representation having a number generation device,
wherein the parameter application is adapted to generate a first value by mapping the timestamp value to first data of the user,
wherein the parameter application is adapted to generate a second value by mapping the timestamp value to configuration data of a parameterized cell (Pcell) from the parameter application,
wherein the parameter application is adapted to generate a third value by mapping the timestamp value to layout data of the parameter application,
wherein the parameter application is adapted to generate a random number by applying a function to the first value, the second value, and the third value, and
wherein the parameter application is adapted to generate a public-private encryption key pair using the random number as a first seed number and using a second number generated by the number generation device as a second seed number.

16. The system according to claim 15, further comprising manufacturing components adapted to produce manufactured IC devices according to the IC representation, wherein the parameter application is adapted to generate the second number using the number generation device of manufactured ones of the IC devices.

17. The system according to claim 16, wherein the public-private encryption key pair comprises a public key and a private key, and wherein the manufacturing components is adapted to store the public key in the number generation device of the manufactured IC devices.

18. The system according to claim 16, wherein the public-private encryption key pair comprises a public key and a private key, and wherein the manufacturing components is adapted to store the private key separate from the manufactured IC devices.

19. The system according to claim 15, wherein the parameter application generates the first value by applying a first function to the first data,
wherein the parameter application generates the second value by applying a second function to the configuration data, and
wherein the parameter application generates the third value further by applying a third function to the configuration data.

20. The system according to claim 15, wherein the parameter application is adapted to generate the configuration data of the parameter application by applying a second function to parameter values of a configuration of a parameterized cell of the parameter application.

* * * * *